Patented July 8, 1941

UNITED STATES PATENT OFFICE 2,248,831

ALKYLATED PHENOL

Gordon H. Stillson, Oakmont, and David W. Sawyer, Pittsburgh, Pa., assignors to Gulf Research & Development Company, Pittsburgh, Pa., a corporation of Delaware No Drawing. Application May 24, 1939, Serial No. 275,538

1 Claim. (Cl. 260—619)

This invention relates to alkylated phenols; and it comprises as a new compound 2,6-di-tertiary-butyl-4-benzylphenol which is soluble in oil and insoluble in water and in dilute aqueous alkali solutions, and possesses the property of inhibiting oxidational changes in organic materials such as petroleum and hydrocarbon products and the like; and it includes stabilized organic materials, particularly petroleum products, containing this compound in relatively small amounts; all as more fully hereinafter set forth and as claimed.

We have discovered that we can produce the compound 2,6-di-tertiary-butyl-4-benzylphenol by treating para-benzylphenol with at least two mols of isobutylene per mol of para-benzylphenol in the presence of an acid catalyst such as sulfuric acid, and that the compound thus produced is soluble in oil and insoluble in water and in dilute aqueous alkali solution. We have also discovered that this new compound 2,6-di-tertiary-butyl-4-benzylphenol possesses very good antioxidant properties, and when added to organic materials, especially petroleum products such as motor fuels, lubricating oils and greases, insulating oils, turbine oils, solvents, waxes and the like in relatively small amounts, it stabilizes such materials against oxidational changes.

In preparing 2,6-di-tertiary-butyl-4-benzylphenol from para-benzylphenol and isobutylene using a sulfuric acid catalyst, commercial concentrated sulfuric acid may be used with or without the addition of a mitigating agent, such as boric acid or an alkali sulfate, adapted to lessen the polymerizing effect of the sulfuric acid on the isobutylene. When commercial concentrated sulfuric acid is used, amounts corresponding to about 5.0 per cent of the weight of the para-benzylphenol have produced satisfactory yields. When a mitigating agent is used, for example boric acid, a solution of 5.0 per cent by weight of boric acid in commercial concentrated sulfuric acid may be used in amounts corresponding to about 5.0 per cent of the weight of the para-benzylphenol.

The catalyst is customarily first mixed with the para-benzylphenol and the isobutylene is passed into the mixture. Isobutylene is added to the mixture until an amount has been absorbed corresponding to at least two mols of isobutylene per mol of para-benzylphenol. In general amounts corresponding to about three mols of isobutylene per mol of para-benzylphenol have proved most advantageous in order to compensate for that used up by polymerization.

It is often desirable to carry out the reaction of the isobutylene with the para-benzylphenol in solution in an inert solvent and to add the sulfuric acid catalyst and the isobutylene to the solution of para-benzylphenol in several portions. For example, the para-benzylphenol in 50 per cent solution in xylene may be mixed with half the necessary catalyst, and isobutylene passed into the mixture slowly until a substantial portion has been absorbed, then the remainder of the catalyst may be added and more isobutylene passed into the mixture until a total of about three mols of isobutylene have been absorbed.

The reaction may be carried out over a relatively wide temperature range. In order, however, to obtain a satisfactory yield in a convenient period of time without excessive loss of isobutylene by polymerization, we find it advantageous to use temperatures between 60° and 80° C.

After the proper amount of isobutylene has been absorbed in the solution of para-benzylphenol and acid catalyst in the inert solvent, and the reaction is complete, the reaction mixture is washed with dilute aqueous alkali solution to remove the acid catalyst and any alkali soluble material remaining. The dilute aqueous alkali solution used for washing is customarily a 20 per cent solution of sodium hydroxid or other alkali solution of equivalent alkalinity. Somewhat weaker solutions may be used if desired. After the alkali wash, the xylene solution of the reaction mixture is washed with water until the washings are substantially neutral to litmus.

The xylene may be removed from the washed neutralized product thus obtained, by disillation under reduced pressure (10–20 mm.) and the residue distilled at 3 mm. pressure. The fraction which boils at 164°–166° C. crystallizes to a white solid which, after recrystallization from ligroin, has a melting point of 60° to 61° C. and an ultimate analysis which corresponds quite closely to the theoretical calculated composition of 2,6-di-tertiary-butyl-4-benzylphenol. For example, the ultimate analysis of a 2,6-di-tertiary-butyl-4-benzylphenol product obtained in this manner compared with the theoretical composition as follows:

| Ultimate analysis | Found for product | Calculated for 2,6-di-tertiary-butyl-4-benzylphenol |
|---|---|---|
| | Percent | Percent |
| Carbon | 85.27 | 85.13 |
| Hydrogen | 9.50 | 9.46 |
| Oxygen | Balance | 5.41 |

The substantially pure 2,6-di-tertiary-butyl-4-benzylphenol product thus obtained is insoluble in water and in dilute aqueous alkali solution, and is soluble in various organic solvents, such as 95 per cent alcohol, ligroin, benzene, ether, gasoline and petroleum products.

The properties of oil solubility and insolubility in dilute aqueous alkali solution, combined with its property of inhibiting oxidational changes, make the 2,6-di-tertiary-butyl-4-benzylphenol of our invention a particularly useful antioxidant in the stabilization of petroleum and hydrocarbon products such as motor fuels, lubricating oils and greases, insulating oils, turbine oils and the like. For example, its insolubility in water makes it particularly advantageous for the stabilizing of gasoline and oils intended for use in contact with water. Also its insolubility in dilute aqueous alkali solution permits its addition to cracked gasoline at an early stage in the process of production, prior to the usual alkali washing step, thereby increasing its effectiveness as an antioxidant.

The following specific examples illustrate the effectiveness of our 2,6-di-tertiary-butyl-4-benzylphenol product in preventing oxidational changes in petroleum products.

When 2,6-di-tertiary-butyl-4-benzylphenol, prepared as above described, was added to cracked gasoline in the proportion of 0.0002 mol per 100 cubic centimeters (0.0592 gram per 100 cc.) the oxygen stability induction period of the gasoline, as determined by the method of Hunn, Fischer and Blackwood, J. Soc. Automotive Eng. 2, 31 (1930), was increased from 7½ hours to 37¾ hours.

When about 0.3 per cent by weight of 2,6-di-tertiary-butyl-4-benzylphenol, prepared according to our invention, was added to a transformer oil having a sludge induction period of zero, in an accelerated transformer oil sludge test, an oil having a sludge induction period of about four days was produced. Since the formation of sludge is recognized to be the result of oxidational changes in the oil and a definite measure of the deterioration of the oil, it will be seen from this test that the addition of very small amounts of our 2,6-di-tertiary-butyl-4-benzylphenol product is effective to inhibit the oxidational changes normally taking place and materially increase the useful life of transformer oils.

While this invention has been described with reference to specific details and examples of the production and properties of the compound of our invention, it is to be understood that the invention is not intended to be limited to such details and examples, except as recited hereinafter in the appended claim.

We claim:

2,6-di-tertiary-butyl-4-benzylphenol.

GORDON H. STILLSON.
DAVID W. SAWYER.